US009336165B2

(12) United States Patent
Ahmad et al.

(10) Patent No.: US 9,336,165 B2
(45) Date of Patent: May 10, 2016

(54) INTERRUPT COALESCING FOR OUTSTANDING INPUT/OUTPUT COMPLETIONS

(71) Applicant: VMware, Inc., Palo Alto, CA (US)

(72) Inventors: Irfan Ahmad, Mountain View, CA (US); Maxime Austruy, Saint-Sulpice (CH); Mallik Mahalingam, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 538 days.

(21) Appl. No.: 13/933,921

(22) Filed: Jul. 2, 2013

(65) Prior Publication Data

US 2013/0297832 A1 Nov. 7, 2013

Related U.S. Application Data

(63) Continuation of application No. 12/766,369, filed on Apr. 23, 2010, now Pat. No. 8,478,924.

(60) Provisional application No. 61/172,602, filed on Apr. 24, 2009.

(51) Int. Cl.
| G06F 13/24 | (2006.01) |
| G06F 3/06 | (2006.01) |
| H04L 12/801 | (2013.01) |

(52) U.S. Cl.
CPC .............. *G06F 13/24* (2013.01); *G06F 3/0659* (2013.01); *G06F 2213/2406* (2013.01); *G06F 2213/2408* (2013.01); *H04L 47/10* (2013.01)

(58) Field of Classification Search
CPC ................. G06F 9/4812; G06F 13/24; G06F 2213/2406; G06F 2213/2408; H04L 47/10; H04L 47/28
USPC ........................................................ 710/262
See application file for complete search history.

(56) References Cited

U.S. PATENT DOCUMENTS

| 6,065,089 A | 5/2000 | Hickerson et al. |
| 6,351,785 B1 | 2/2002 | Chen et al. |
| 6,529,986 B1 | 3/2003 | Chen et al. |
| 6,988,156 B2 | 1/2006 | Musumeci |
| 7,054,972 B2 | 5/2006 | Parry et al. |

(Continued)

OTHER PUBLICATIONS

Ahmad et al.; "Improving Performance with Interrupt Coalescing for Virtual Machine Disk IO in VMware ESX Server"; International Workshop on Virtualization Performance: Analysis, Characterization, and Tools (VPACT) 2009; Apr. 26, 2009; all pages.

*Primary Examiner* — Glenn A Auve

(57) ABSTRACT

In a computer system, a method of controls interrupts which correspond to input/output (I/O) processing. For each delivery of an I/O completion interrupt, the method provides a recordation of a delivery time; identifies I/O completions for which deliveries of corresponding I/O completion interrupts involve deliveries of inter-processor interrupts; and for each of the identified I/O completions, accesses the recordation of the most recent delivery time to determine whether a selected period of time has elapsed since a last delivery of an inter-processor interrupt. As a response to a determination that the selected period has elapsed, an inter-processor interrupt is delivers. As a response to a determination that less than the duration of the selected period has elapsed, the method refrains from delivering an inter-processor interrupt.

21 Claims, 8 Drawing Sheets

(56) References Cited

U.S. PATENT DOCUMENTS

| | | |
|---|---|---|
| 7,120,717 B2 | 10/2006 | Vu |
| 7,444,451 B2 | 10/2008 | Wang |
| 7,478,186 B1 * | 1/2009 | Onufryk .................. G06F 13/24 710/263 |
| 7,613,860 B2 | 11/2009 | Clark et al. |
| 7,788,434 B2 | 8/2010 | Pesavento et al. |
| 7,788,435 B2 | 8/2010 | Worthington et al. |
| 8,112,555 B2 | 2/2012 | Anand et al. |
| 8,291,135 B2 | 10/2012 | Subramanian et al. |
| 8,478,924 B2 | 7/2013 | Ahmad et al. |
| 2003/0200368 A1 * | 10/2003 | Musumeci .............. G06F 13/24 710/260 |
| 2004/0117534 A1 | 6/2004 | Parry et al. |
| 2005/0086401 A1 * | 4/2005 | Connor .................. G06F 13/24 710/48 |
| 2005/0182879 A1 | 8/2005 | Vu |
| 2008/0147946 A1 | 6/2008 | Pesavento et al. |
| 2010/0274938 A1 | 10/2010 | Anand et al. |
| 2011/0016246 A1 | 1/2011 | Hiroki |
| 2011/0179413 A1 | 7/2011 | Subramanian et al. |
| 2012/0239832 A1 | 9/2012 | Subramanian et al. |

* cited by examiner

INTERRUPT COALESCING FOR OUTSTANDING INPUT/OUTPUT COMPLETIONS

CROSS REFERENCE TO A RELATED APPLICATION

This application is a continuation of U.S. patent application Ser. No. 12/766,369 filed Apr. 23, 2010, issued as U.S. Pat. No. 8,478,924 on Jul. 2, 2013, which claims priority from U.S. Provisional Application No. 61/172,602, filed Apr. 24, 2009, both of which are incorporated herein by reference in their entirety.

BACKGROUND ART

In a computer system, there are various types of "interrupts," which may be considered as requests for attention for a processor. Typically, when the processor receives an interrupt, it suspends its current operations, saves the status of its work, and transfers control to a special routine. An interrupt handler may be utilized to process instructions for a particular interrupt. Interrupts can be generated, for example, by various hardware devices to request service or report problems, or by the processor itself in response to program errors or requests for operating-system services.

Input/output (I/O) interrupts are typically generated on the basis of requesting attention to an I/O completion. Even if consideration is restricted to I/O interrupts, there are different types. Physical I/O interrupts are delivered in both a physical system and a virtualized system. A virtualized computer system will be described briefly below (when referring to FIG. 1), but a range of such systems exist. For example, various virtualized systems are commercially available from VMware, Inc., the assignee of this patent document. Virtual I/O interrupts occur routinely within a virtualized or para-virtualized system.

In addition, an I/O completion may trigger an inter-processor interrupt (IPI). IPIs allow one processor to interrupt a second processor within a multiprocessor system. An IPI may be utilized in either a virtualized or non-virtualized system when an interrupt is issued to the first processor for an event that is relevant to the second processor. For example, if an I/O interrupt is directed to a first processor, but the first processor is not running the targeted Virtual Machine (VM) having interest in the I/O completion, the interrupt is redirected. The interrupt is steered to the second processor which is running the targeted VM. This software-based interrupt steering often causes a reduction in performance. Thus, IPIs are "expensive."

FIG. 1 illustrates one generalized virtualized computer system. The illustrated elements may be substantially the same as corresponding elements of other VMware patents and applications. The virtualized computer system of FIG. 1 comprises system hardware 10, which interfaces with one or more disks 12 (or other storage media). System hardware 10 comprises memory 14 and a storage adapter 16 appropriate for the disk. Virtualization software runs on the system hardware 10 and supports at least one Virtual Machine (VM) 18. As different virtualization functionalities are being implemented in hardware, including in recent microprocessor architectures and in recent I/O devices, the virtualization software may be referred to more broadly as virtualization logic 20. Thus, virtualization logic may comprise a wide variety of virtualization functionalities, whether the various functionalities are implemented in hardware, software or firmware.

Virtualization logic 20 comprises a VMKernel 22 and a Virtual Machine Monitor (VMM) 24. The VMKernel further comprises a disk device driver 46 appropriate for the storage adapter 16. The VMM further comprises one or more modules that emulate one or more virtual disks 28 and a virtual storage adapter 30 for use in or by the VM. The disk emulation functionality for emulating the virtual disk 28 may actually be implemented partially in the VMKernel and partially in the VMM. The VM 18 comprises virtual system hardware 32, including one or more virtual Central Processing Units (vCPUs) or virtual processors 34, virtual memory 36 and virtual storage adapter 30. A guest Operating System (OS) 38 runs on the virtual system hardware 32, along with one or more guest applications 40. The guest OS includes a disk device driver 26 appropriate for the virtual storage adapter 30. Although the virtual disk 28 is shown separate from the physical disk 12, the virtual disk may actually be implemented using portions of the physical disk.

In FIG. 1, if one of the guest applications 40 requires data from a file stored on the virtual disk 28, the guest OS 38 and device driver 26 will process the "data read", and this virtual disk read will be conveyed to the virtual storage adapter 30. The VMM 24 and the VMKernel 22, including the disk/adapter emulator 44 and the device driver 46, convert the virtual disk data read to a corresponding disk read from the physical disk 12. This physical disk read is conveyed to the storage adapter 16. The data resulting from the physical disk read is written to physical memory 14 in a conventional manner and a physical disk I/O completion interrupt is raised at a physical CPU 48 in the system hardware 10. The VMKernel 22 determines the VM 18 to which the physical I/O completion relates and the VMKernel and the VMM 24 emulate a virtual disk I/O completion. This virtual disk I/O completion virtualizes a data read from the virtual disk 28 to the virtual memory 36. As a result, a virtual disk I/O completion interrupt is delivered to the virtual CPU 34. In response to the interrupt, the guest OS 38, including the device driver 26, provides the data to the application 40.

A virtualized computer system may be set up to provide high I/O rates. For example, the disk 28 may actually be a Storage Area Network (SAN) and the storage adapter 30 may actually be one or more Host Bus Adapters (HBAs). Many important datacenter applications today exhibit high I/O rates. For example, transaction processing loads can issue hundreds of very small I/O operations in parallel resulting in tens of thousands of I/Os per second (IOPS). Such high IOPS are now within reach of even more IT organizations with faster storage controllers, increasing deployments of high performance consolidated storage devices using SAN or Network-Attached Storage (NAS) hardware and wider adoption of solid-state disks.

In both virtualized and non-virtualized (physical) environments, at high I/O rates the vCPU or CPU overhead for handling all the interrupts may be high and can eventually lead to lack of CPU resources for the application itself. CPU overhead is even more of a problem in virtualization scenarios in which a goal is to consolidate as many virtual machines into one physical box as possible. Traditionally, interrupt coalescing or moderation has been used in storage controller cards to limit the number of times application execution is interrupted by a device to handle I/O completions. For interrupt coalescing, attempts are made to carefully balance the increase in I/O latency with the improved execution efficiency resulting from delivering fewer interrupts.

In hardware controllers, fine-grained timers may be used in conjunction with interrupt coalescing to establish an upper bound on the increased latency of coalescing I/O completion notifications. That is, a timer may be employed to fire a I/O completion interrupt if a time limitation has been reached since a last I/O completion interrupt. Such timers are difficult to implement and are inefficient to use in virtualization logic. This problem is challenging for other reasons, both in virtualized and physical environments.

SUMMARY OF THE INVENTION

In a computer system, a method of controls interrupts which correspond to input/output (I/O) processing. For each delivery of an I/O completion interrupt, the method provides a recordation of a delivery time; identifies I/O completions for which deliveries of corresponding I/O completion interrupts involve deliveries of inter-processor interrupts; and for each of the identified I/O completions, accesses the recordation of the most recent delivery time to determine whether a selected period of time has elapsed since a last delivery of an inter-processor interrupt. As a response to a determination that the selected period has elapsed, an inter-processor interrupt is delivers. As a response to a determination that less than the duration of the selected period has elapsed, the method refrains from delivering an inter-processor interrupt.

BRIEF DESCRIPTION OF THE DRAWINGS

Various aspects of at least one embodiment of the present invention are discussed below with reference to the accompanying figures. In the figures, which are not intended to be drawn to scale, each identical or nearly identical component that is illustrated in the various figures is represented by a like numeral. For purposes of clarity, not every component may be labeled in every drawing. The figures are provided for the purposes of illustration and explanation and are not intended as a definition of the limits of the invention. In the figures.

DETAILED DESCRIPTION

Figure 1:
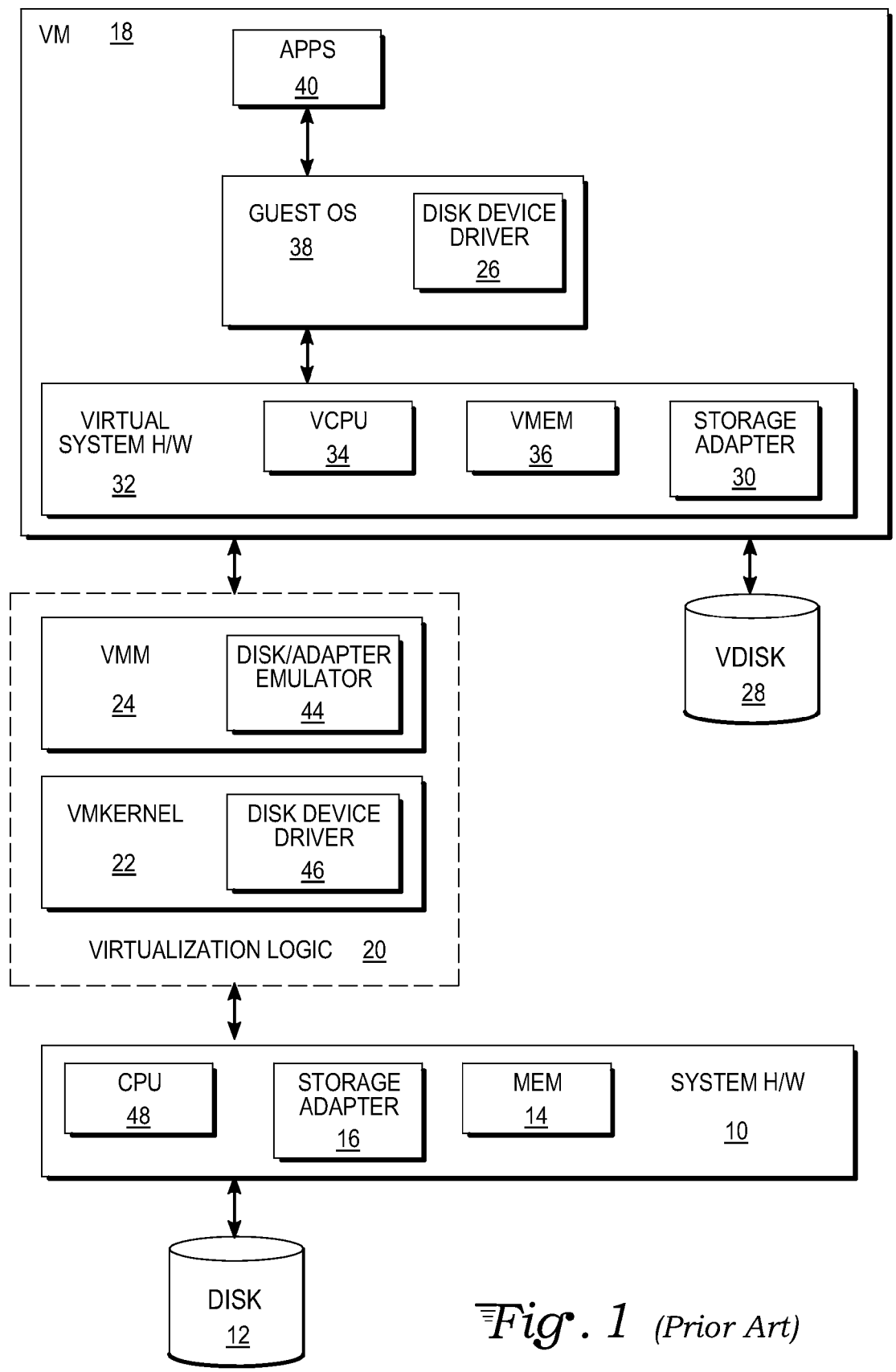
FIG. 1 is a block diagram of a system in which embodiments of controlling interrupt coalescing may be implemented.

With reference to FIG. 1, the method described herein relates to coalescing multiple I/O completions, so that the multiple I/O completions can be conveyed to a vCPU 34 (or to a physical CPU) with a single interrupt. The method of controlling interrupt coalescing will be described primarily with respect to use in a virtualization environment, but can be applied to para-virtualization systems and purely physical systems.

Previously, some storage adapters have been designed to coalesce interrupts to be delivered to a physical CPU. Such hardware implementations of interrupt coalescing often involve the use of high resolution timers to ensure that the latency introduced by the interrupt coalescing is not excessive. A similar implementation, using a high resolution timer, for coalescing interrupts delivered to a vCPU 34 in a virtualized computer system would be less practical, if it is feasible, due to high CPU overhead associated with CPU mode switches in the virtualized environment.

Figure 2:
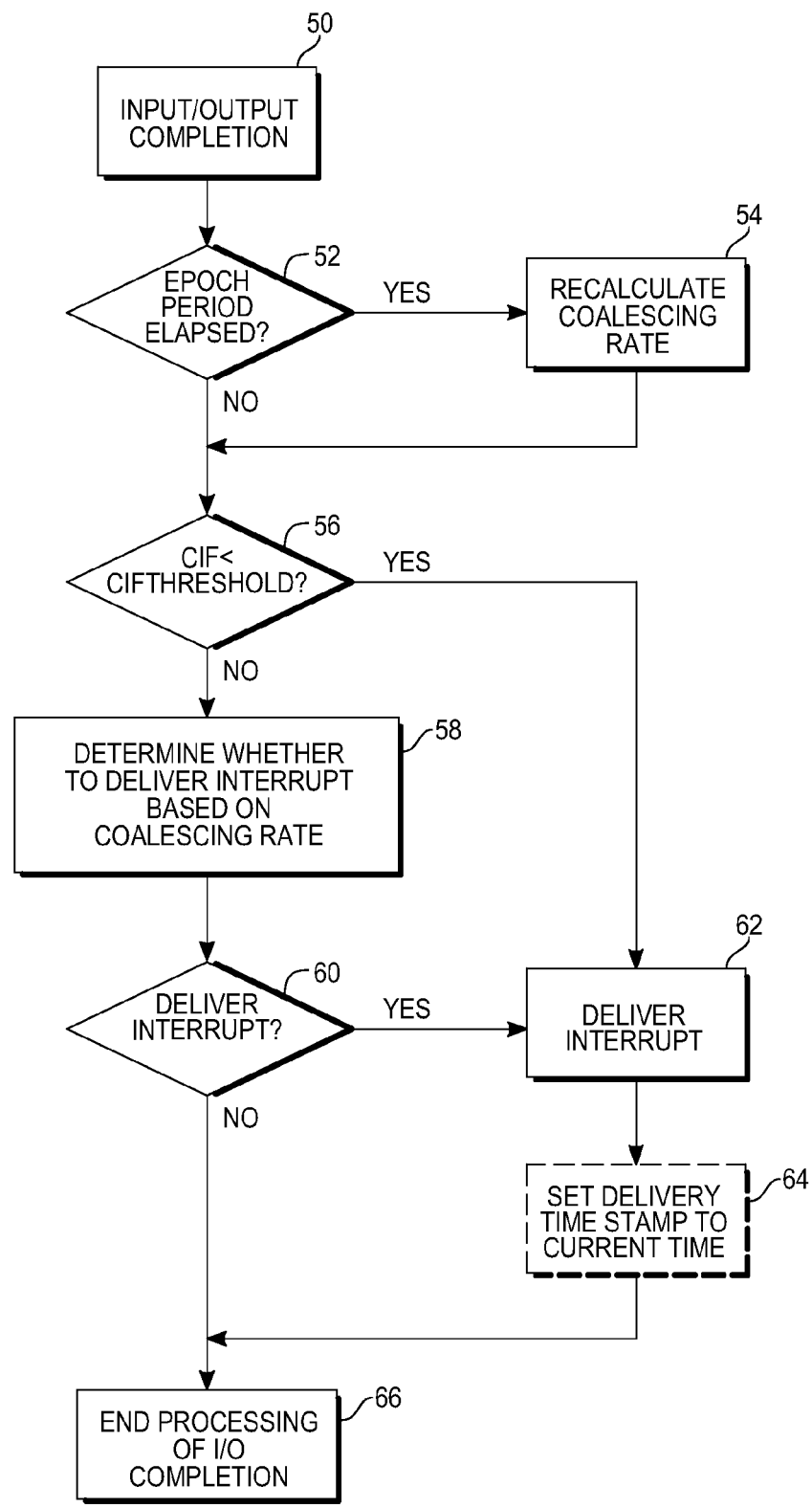
FIG. 2 is a flow chart illustrating one method of coalescing interrupts in processing input/output completions by virtualization logic within a virtualized computer system.

Referring now to FIGS. 1 and 2, in one embodiment the VMM 24 selectively coalesces interrupts, resulting from disk I/O completions, for delivery to the vCPU 34. The process is triggered at the VMM 24 in response to each disk I/O completion. Thus, at step 50, an I/O completion corresponding to an access to disk 12 is directed toward the VM 18, by the VMKernel 22. At a step 52, the VMM determines whether an epoch period has elapsed. The epoch period may be established in a wide variety of static or dynamic manners. For example, the virtualization logic 20 may be designed to implement a specific epoch period. Alternatively, while the virtualization logic may be designed to have a specific default epoch period, an administrator of the virtualized computer system may change the epoch period, as desired. As another alternative, the virtualization logic may dynamically determine an epoch period based on observations of characteristics of the workload executing in the virtualized computer system. As one possibility, the default epoch period may be 200 milliseconds.

If it is determined at decision step 52 that the epoch period has elapsed, the VMM 24 recalculates a coalescing rate at a step 54. Various methods may be used to calculate a coalescing rate, based on various system parameters, configuration settings, service level specifications, workload characteristics, etc. One method that may be used to calculate a coalescing rate is presented below in connection with a first set of pseudocode (Pseudocode 1). According to Pseudocode 1, no interrupt coalescence will occur if requirements with respect to two thresholds are not satisfied. Thus, if during the epoch period prior to the recalculation, the rate of I/Os (I/Os per second) does not exceed a threshold, the coalescing rate is set at 1, resulting in a one-to-one correspondence between detected I/O completions and delivered interrupts. Moreover, if the measure of "commands in flight" (CIF) does not exceed a CIF threshold, the coalescing rate is set at 1. As is known, the term "commands in flight" refers to the number of I/O commands conveyed (such as conveyed to disk 12) for which a corresponding I/O completion has not yet been received. The CIF threshold value may be established in a variety of ways, including having a set value programmed into the virtualization logic 20 or determining an appropriate value based on the characteristics and/or current workload of disk 12. With respect to step 54, the measure of CIF may be the current (instantaneous) value at the time of the recalculation, or the average CIF (avgCIF) during the epoch period prior to the recalculation, or another function of the observed CIF during that epoch period, such as an average exponentially weighted moving average or other statistical function. Where the threshold regarding the rate of I/Os is exceeded, the coalescing rate calculated at step 54 will implement interrupt coalescing and will be based on a determination of I/O commands for which corresponding I/O completions have not been received.

Next, at a step 56, the VMM 24 determines whether the number of disk I/O commands in flight currently exceeds the threshold value (CIFthreshold). This may be the instantaneous CIF value, whereas the CIF applied at recalculation step 54 may be determined with a different approach, as noted above. Therefore, the CIFthreshold decision step 56 is not a mere repeat of the CIF threshold determination that occurs in some embodiments of the recalculation step 54. In the example implementation that will be described in detail below (see Table 1), the CIFthreshold is set at three. If CIF is below the CIFthreshold at step 56, the method of FIG. 2 proceeds to a step 62 of immediately delivering an interrupt for the detected I/O completion. Otherwise, the method proceeds to a step 58.

At step 58, the VMM 24 determines whether an interrupt should be delivered with respect to this particular I/O completion based on the current coalescing rate. Because the sequence of steps is executed for each detection of an I/O completion, step 58 involves a collective processing of I/O completions as applied to a single I/O completion. One possible embodiment for an application at step 58 is described below in connection with a second set of pseudocode (Pseudocode 2). On the basis of step 58, if it is determined at step 60 that an interrupt should be delivered, the method of FIG. 2 proceeds to step 62 and an interrupt is delivered. Otherwise, no interrupt is currently delivered for the I/O completion detected at step 50 and the method proceeds to a step 66. A negative determination at decision step 60 will lead to interrupt coalescence with a subsequent detection of an I/O completion at step 50, although not necessarily the next detected I/O completion.

At step 62, an interrupt is delivered to the vCPU 34. Persons of skill in the art will understand how to deliver interrupts to a virtual processor in a virtualized computer system. Multiple I/O completions, including the one in response to which the method of FIG. 2 is currently being performed, may be processed in response to the delivered interrupt, resulting in a coalescing of interrupts.

After step 62, an optional step 64 may be performed. The significance of this step will be described in greater detail below. Briefly, at step 64, a current timestamp is written to a delivery timestamp variable. This delivery timestamp variable may be used, in some implementations, under some circumstances, to reduce the number of inter-processor interrupts (IPIs) in a multiprocessor computer system, resulting in a coalescing of IPIs as well. Finally, the method of FIG. 2 ends at step 66, and the processing of the current I/O completion by the VMM 24 is complete.

Interrupt coalescing is a proven technique for reducing CPU utilization when processing high I/O rates in storage and networking controllers. Virtualization introduces a layer of virtual hardware whose interrupt rate can be controlled by the virtualization logic. The following description relates to the design and implementation of a virtual interrupt coalescing scheme for virtual SCSI hardware controllers in a virtualized computer system. However, the method of controlling deliveries of interrupts may be utilized in coalescing physical interrupts and in other applications within a virtualized computer system.

The number of commands in flight from the guest operating system may be used to dynamically set the interrupt coalescing rate. Compared to existing techniques in hardware, this implementation does not rely on high resolution interrupt delay timers and, therefore, leads to a relatively efficient implementation in virtualization logic. Furthermore, the technique is generic and therefore applicable to all types of disk I/O controllers which, unlike networking, do not receive anonymous traffic. This description of basing coalescence on the commands in flight relates, in particular, to virtual interrupt coalescing on the VMware ESX Server virtualization product, but the invention can also be implemented in a wide variety of other virtualized (or non-virtualized computer systems).

As previously noted, current transaction processing loads can issue hundreds of very small I/O operations in parallel, resulting in thousands of I/Os per second (IOPS). For high I/O rates, the CPU overhead for handling all the interrupts can get very high and eventually lead to lack of CPU resources for the application itself. CPU overhead is even more of a problem in virtualization scenarios, where one goal is to consolidate as many virtual machines into one physical box as possible. Traditionally, interrupt coalescing or moderation has been used in storage controller cards to limit the number of times application execution is interrupted by the device to handle I/O completions. This technique has to carefully balance an increase in I/O latency with the improved execution efficiency due to fewer interrupts. In hardware controllers, fine-grained timers may be used to keep an upper bound on the added latency of I/O completion notifications. Such timers are difficult and inefficient to use in virtualization logic and one has to resort to other pieces of information to avoid longer delays.

Traditionally, there are two parameters that need to be balanced: maximum interrupt delivery latency (MIDL) and maximum coalesce count (MCC). The first parameter denotes the maximum time that one can wait before sending the interrupt and the second parameter denotes the number of accumulated completions before sending an interrupt to the operating system (OS). The OS is interrupted based on whichever parameter is reached first.

In at least one embodiment of the method described herein, the problem of coalescing interrupts for virtual devices is addressed without assuming any support from hardware controllers and without using high resolution timers. The embodiment controls both MIDL and MCC by setting the delivery rate of interrupts based on the current number of commands in flight (CIF) from the guest OS 38 in FIG. 1. As one implementation, the coalescing rate, denoted as R, is simply the ratio of a measure of virtual interrupts sent to the guest OS divided by the number of actual I/O completions received for that guest OS. Note that $0<R\leq1$. If $R=1$, no interrupt coalescing occurs. Lower values of R denote a higher degree of coalescing. R is increased when CIF is low. On the other hand, the delivery rate R is decreased for higher values of CIF. Unlike network I/O, CIF can be used directly only for storage controllers, because each completed request has a corresponding command in flight. Also, it is beneficial to maintain a certain number of commands in flight to efficiently utilize the underlying storage device, such as disk 12 in FIG. 1. Many important applications issue synchronous I/Os and delaying the completion of prior I/Os can delay the issuance of future ones.

Implementation of the Method of Controlling Coalescence Based on Commands in Flight By defining the parameter called "interrupt delivery rate," or coalescing rate R, as the ratio of (a) interrupts delivered to the guest OS 38 to (b) the actual number of interrupts received from the I/O device 12 for that guest, the current value of R is established in a way that will provide coalescing benefits for the vCPU 34. Additionally, any extra vIC-related (virtual interrupt coalescence-related) latency is controlled. This is accomplished by using CIF as the main parameter and the IOPS rate as a secondary control.

At a high level, if the IOPS rate is high, more interrupts can be coalesced within a given time period, thereby improving CPU efficiency. Moreover, it is still possible to limit the increase in latency for cases when the IOPS rate changes drastically or when the number of issued commands is very low. Control is provided by using CIF as a guiding parameter, which determines the overall impact that the coalescing can have on the workload. For example, coalescing four I/O completion interrupts out of thirty-two outstanding CIF is unlikely to be a problem, since the storage device 12 can remain busy with the remaining twenty-eight CIF. On the other hand, even a slight delay caused by coalescing two I/Os out of four outstanding CIF could result in the resources of the storage device 12 not being fully utilized. Thus, it is beneficial to vary the delivery rate R in inverse proportion of the CIF value.

There are three main parameters used in this embodiment of the method. The first is the iopsThreshold, which is the IOPS rate below which no interrupt coalescing is to be performed. Thus, this threshold establishes an IOPS value which must be exceeded if interrupts are to be coalesced. The second main parameter is CIFthreshold. This threshold establishes a CIF value (CIF-1) which must be exceeded if interrupt coalescing is to be performed. Thirdly, the epochPeriod is the time interval after which the delivery rate is re-evaluated in order to react to a potential change in the workload.

The method operates in one of the three modes. In the first mode, virtual interrupt coalescing (vIC) is disabled if the achieved throughput of a workload drops below the threshold defined by iopsThreshold. Unlike many prior approaches, the method does not rely upon a high resolution timer to determine when it has been "too long" since a last I/O completion. Instead of a timer, the method relies on future I/O completion events to control latency. For example, an IOPS rate of 20,000 means that, on average, there will be a completion returned every 50 microseconds. The default iopsThreshold may be 2000, which implies a completion on average every 500 microseconds. Therefore, at worst, we can add that amount of latency. For higher IOPS, the extra latency only decreases. In order to do this, we keep an estimate of the current number of IOPS completed by the VM 18.

In the second mode, vIC is disabled whenever the number of outstanding CIF drops below the configurable parameter CIFthreshold. The interrupt coalescing method is designed to be conservative, so as to not increase the application I/O latency for trickle I/O workloads. Such workloads have very strong I/O inter-dependencies and generally issue only a very small number of outstanding I/Os. A canonical example of an affected workload is dd (Unix-based imaging) which issues one I/O at a time. For dd, if an interrupt were coalesced, it would actually hang. In fact, waiting would be of no use for such cases. When only a small number of I/Os (CIFthreshold) remain outstanding on an adapter, the method disables coalescing. Otherwise, there may be a throughput reduction.

In the third mode, interrupt coalescing is enabled and the rate R is established dynamically. Setting the interrupt coalescing rate (R) dynamically is challenging, since there is a goal of balancing the CPU efficiency gained by coalescing against additional latency that may be added, especially since that may in turn lower achieved throughput. The following description relates to dynamically setting the coalescing rate R.

Which rate is selected depends upon the number of commands in flight (CIF) and the configuration option "CIFthreshold". As CIF increases, there is more room to coalesce. For workloads with multiple outstanding I/Os, the extra delay works well, since the method amortizes the cost of the interrupt being delivered to process more than one I/O. For example, if the CIF value is 24, even if three I/Os are processed at a time, the application 40 will have twenty-one other I/Os pending at the storage device 12 to keep it busy.

In selecting the value of R, there are two main issues to resolve. First, in this particular embodiment, selecting an arbitrary fractional value of R is not desirable because this embodiment lacks floating point calculations in the VMM 24 code. Second, a simple ratio of the form 1/x based on a counter x would imply that the only delivery rate options available to the method would be (100%, 50%, 25%, 12.5%, ... ). The jump from 100% down to 50% may be too drastic. Instead, to be able to handle a multitude of situations, it is preferable to deliver anywhere from 100% down to 6.25% of the incoming I/O completions as interrupts. This is shown in Table 1, which is a percentage-based representation of an embodiment, where CIFthreshold=3.

TABLE 1

| CIF | Interrupt Delivery Rate |
| --- | --- |
| 1-3 | 100% |
| 4-7 | 80% |
| 8-11 | 75% |
| 12-15 | 66% |
| >=16 | 8/CIF * 100% |
| e.g. CIF == 64 | 12% |

By allowing rates between 100% and 50%, it is possible to better manage the throughput loss at smaller CIF. Table 1 shows a range of values as encoded in Pseudocode 1, which is one embodiment of the processing that may occur at step 54 of FIG. 2.

Pseudocode 1: Calculate coalescing rate

```
if (currIOPS < iopsThreshold) AND CIF < CIFthreshold
then
    R = 1
else if cif < 2 * CIFthreshold then
    R = 4/5
else if cif < 3 * CIFthreshold then
    R = 3/4
else if cif < 4 * CIFthreshold then
    R = 2/3
else
    R = 8/CIF
```

While Pseudocode 1 implements a single step of FIG. 2, Pseudocode 2 is one embodiment of code for many of the identified steps. In order to implement steps 58 and 60, two fields (countUp and skipUp) may be set dynamically to express the delivery ratios. Intuitively, the method delivers (countUp) out of every (skipUp) interrupts, i.e. R=countUp/skipUp. Thus, to deliver 80% of the interrupts, countUp=4 and skipUp=5. Similarly, for 6.25% countUp=1 and skipUp=16. An acceptable Pseudocode 2 is:

Pseudocode 2: Monitor virtual device emulation-I/O Completion Handler Pseudocode

```
cif = Current number of commands in flight (CIF);
CIFthreshold : Configurable min CIF (global);
epochStart : Time at start of current epoch (global);
```

Pseudocode 2: Monitor virtual device emulation-I/O Completion Handler Pseudocode

```
epochPeriod : Duration of each epoch (global);
diff = currTime( ) – epochStart;
if (diffMS > epochPeriodMS)
then
    IntrCoalesceRecalc(currMS( );diffMS; cif );
if (cif < CIFthreshold)
then
    counter ← 1;
    deliverIntr( );
else if (counter < countUp) then
    counter++;
    deliverIntr( );
else if (counter >= skipUp)
then
    counter = 1;
    deliverIntr( );
else
    counter++;
    exit; /* don't deliver */
```

Thus, for any given I/O completion, Pseudocode 2 is executed at the VMM 24 of FIG. 1 to determine whether to post an interrupt to the guest or to coalesce it with a future one. This execution considers (at step 52) whether the epoch period has elapsed (diffMS>epochPeriodMS), which defaults to 200 milliseconds in one embodiment. If the period has elapsed, the coalescing rate is recalculated (at step 54), so as to react to changes in workloads. That is, the function IntrCoalesceRecalc( ) within Pseudocode 2 is the execution of Pseudocode 1. The execution of the code also considers (at step 56) whether the current value of CIF is less than the CIFthreshold (cif<CIFthreshold). If yes, an interrupt is immediately delivered (at step 62), rather than the interrupt being possibly coalesced with a subsequent interrupt as a consequence of determinations at steps 58 and 60.

In Pseudocode 2, "counter" is an abstract number, which counts at each I/O completion detection of step 50. The count is from one until countUp −1 is reached, delivering an interrupt at step 62. The counter then continues to count up until skipUp −1 while skipping the delivery of an interrupt each time. Finally, once counter reaches skipUp, it is reset to one and an interrupt is delivered. It is helpful to consider two examples of a series of counter values as more I/Os arrive, along with whether the method delivers an interrupt as tuples of (counter; deliver?). In a first example of interrupt deliver (a "yes") or skip (a "no"), the countUp/skipUp ratio is 3/4, such that a series of four I/Os provides: (1; yes), (2; yes), (3; no), (4; yes). In comparison, the second example has a countUp/skipUp of 1/5: such that the deliveries and skips for five I/Os follow: (1; no), (2; no), (3; no), (4; no), (5; yes).

Finally, the method may include the update of the timestamp (Delivery Time Stamp) at step 64, corresponding to the delivery time in a memory area shared between VMM 24 and ESX VMKernel 22. As will be described with reference to FIG. 4, this possible timestamp may be utilized to reduce the number of IPIs that are sent.

Selective Deliveries of Inter-Processor Interrupts (IPIs)

Still referring to FIG. 1, another problem that is addressed is specific to virtualized computer systems in which the host storage stack, within the VMKernel 22, receives and processes an I/O completion before routing it to the issuing VM 18. In a multi-processor physical system, the virtualization logic 20 may need to send an inter-processor interrupt (IPI) from a first CPU 48 that received the hardware interrupt to a second CPU that is in fact running the VM for notification purposes. As processor core density increases, it becomes more likely that hardware interrupts will be received on processors not running the target VM, thus increasing the number of times that IPIs need to be issued. The method and system provide a mechanism to reduce the number of IPIs issued using the timestamp of the last interrupt that was sent to the guest OS 38. This reduces the overall number of IPIs while bounding the latency of notifying the guest OS 38 about an I/O completion.

Figure 3:
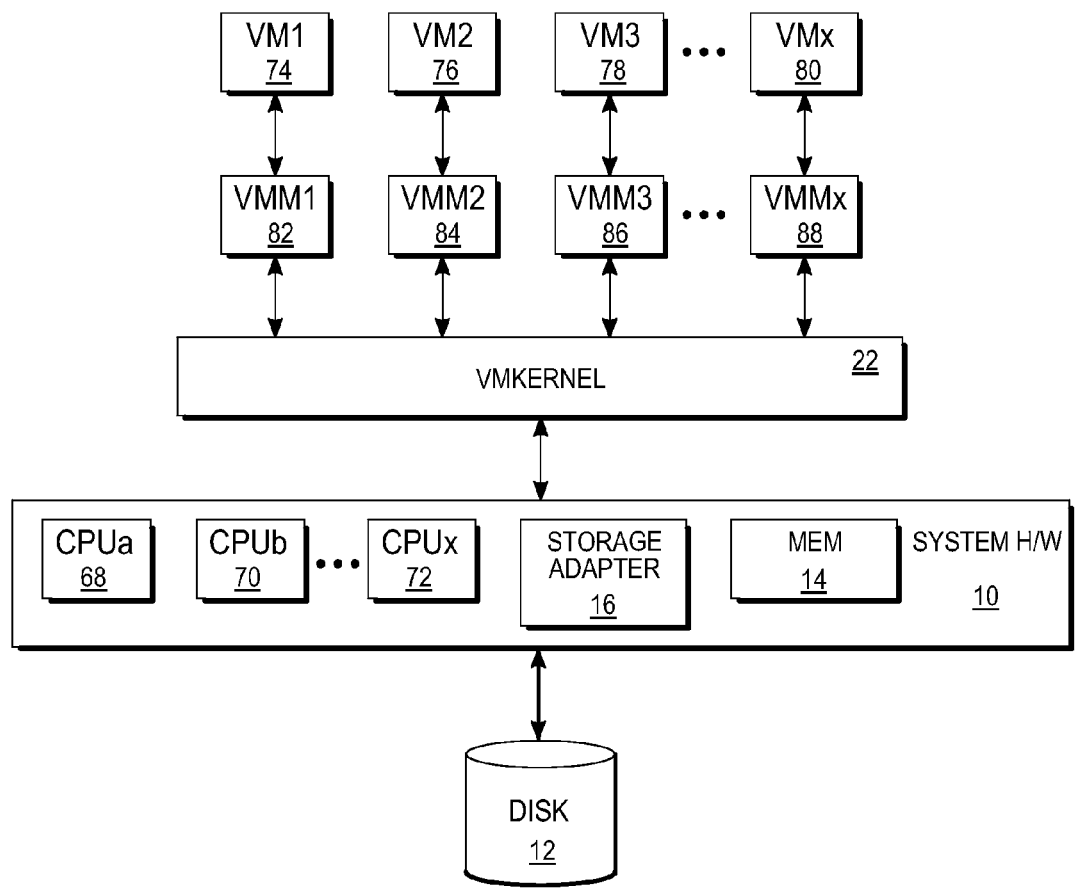
FIG. 3 is a block diagram of selected system components of a multi-processor computer system having virtualized machines for executing interrupt coalescence.

A multi-processor physical system is shown in FIG. 3. Within the system, each CPU 68, 70, and 72 may cooperate with the VMkernel 22 for running one or more of the Virtual Machines (VM) 74, 76, 78, and 80. Each VM is operatively associated with a VMM 82, 84, 86 and 88, but the method may be used in alternative virtual system environments. The difficulty occurs when an I/O completion interrupt is directed to one physical CPU (for example, CPUa 68) for an I/O completion that is relevant to a VM 78 that is run by a different CPU (for example, CPUb 70). For such an occurrence, the interrupt is redirected to the actual CPU 70 as an IPI.

Figure 4:
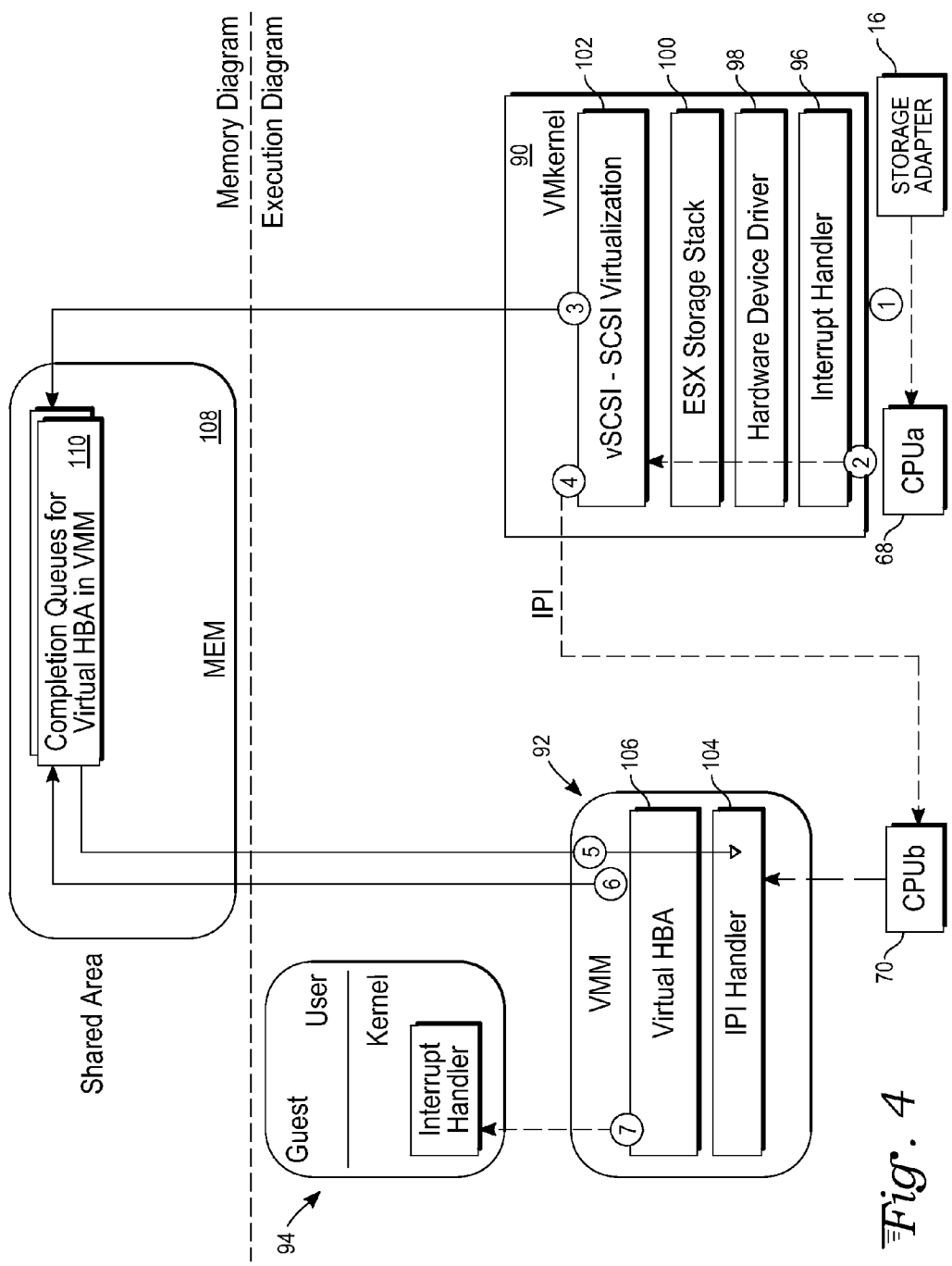
FIG. 4 is a diagram illustrating a multi-processor computer system that includes a virtual machine and that enables one embodiment for coalescing interrupts.

One system model for applying the method is shown in FIG. 4. This system consists of two components in a VMware ESX Server, namely a ESX VMKernel 90 and the VMM 92. The VMKernel is a hypervisor server which is a thin layer of software controlling access to physical resources among virtual machines. Only one VM 94 is represented in FIG. 4. The ESX server provides isolation and resource allocation among virtual machines running on top of the server. The relevant components include an interrupt handler 96, a device driver 98, the ESX storage stack 100, and the virtualized SCSI 102.

The VMM 92 is responsible for correct and efficient virtualization of the x86 instruction set architecture, as well as common, high performance devices made available to the guest 94. The VMM is also the conceptual equivalent of a "process" to the ESX VMKernel 90. The VMM intercepts all the privileged operations from the VM, including I/Os and handles them in cooperation with the VMKernel. The relevant components include an IPI handler 104 and a virtual HBA 106.

Figure 5:
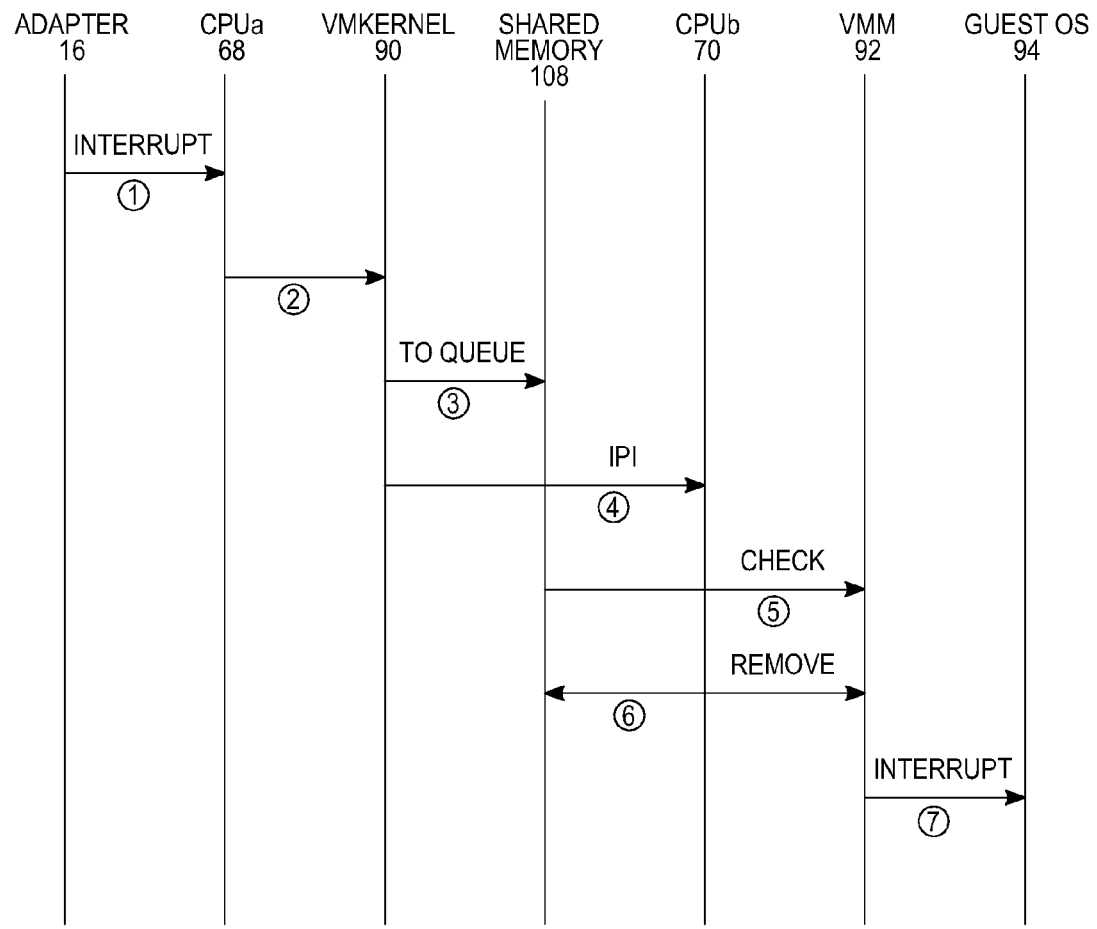
FIG. 5 is a representation of signal exchanges within the virtualized computer system of FIG. 4, but without the functionality of inter-processor interrupt coalescence.

In FIGS. 4 and 5, circled low-value numbers refer to signal exchanges. These circled numbers will be placed in parentheses within the below description. The ESX VMKernel 90 is executing a storage stack code on the first CPU 68. Here, the guest 94 is running on top of its VMM 92, which is running on the second CPU 70. When an interrupt is received from storage adapter 16 (1), appropriate code in the VMKernel 90 is executed to handle the I/O completion (2) all the way up to the vSCSI subsystem 102. This allows the "target" guest 94 to be identified. As previously noted, there is an array of VMMs, but only one is represented in FIG. 4. Each VMM accesses a portion of a shared memory 108 with the ESX VMKernel. Within the shared memory, the VMKernel posts I/O completions in a queue (3). Following the post, the IPI (4) is delivered to notify the VMM of the post. The VMM can pick up available completions on its next execution (5) and process them (6), resulting in the virtual interrupt finally being fired (7) to the guest 94. These exchanges represent one possible approach known in the art.

Without explicit interrupt coalescing, the VMM 92 always asserts the level-triggered interrupt line for every I/O. Level-triggered lines do some implicit coalescing, but that only helps if two I/Os are completed back-to-back in the very short time window before the guest interrupt service routine has had the chance to deassert the line.

Only the VMM 92 can assert the virtual interrupt line and it is possible after step (3) that the VMM may be unable to execute for a while. To limit any latency implications of this, the VMKernel 90 may take one of two actions. It will schedule the VM 94, if it happened to have been descheduled. Otherwise, if both the VM and the VMKernel are executing on separate cores at the same time, the VMKernel sends the IPI, in step (4). This is purely an optimization to provide low latency for I/O completions to the guest. For example, the guest might be mostly doing user space operations, which would result in a long delay until the VMM takes execution control. Correctness guarantees can still be met even if the IPI is not issued, since the VMM will pickup the completion as a matter of course the next time that it is invoked via a timer interrupt or a guest exiting into VMM mode due to a privileged operation.

FIGS. 4 and 5 may be summarized more succinctly as follows. When a disk I/O completes, an interrupt is fired (1) from a physical adapter 16 to a particular Physical CPU (PCPU) 68, where the interrupt handler 96 of the VMKernel 90 delivers it to the appropriate device driver 98 (2). Higher layers of the VMKernel storage stack process the completion until the I/O is matched (e.g., by vSCSI layer) to a particular Guest Operating System 94 (which issued the I/O) and its corresponding VMM 92. The vSCSI then updates the shared completion queue 110 for the VMM and, if the guest or VMM is currently executing, issues (4) the inter-processor interrupt (IPI) to the target PCPU 70 on which the guest OS is running. The IPI is only a latency optimization, since the VMM would have inspected the shared queues 110 the next time the guest exited to the VMM 92. The IPI handler 104 of the VMM receives the signal (5) and inspects the completion queues of its virtual SCSI host bus adapters (HBAs) 106, processes and virtualizes the completions (6), and fires a virtual interrupt to the guest OS (7).

Based on the design described above, there are two inefficiencies in the existing mechanism. First the VMM 92 will potentially interrupt the guest 94 for every interrupt that is posted by the VMKernel 90. There are benefits to coalescing these to reduce the overhead of the guest CPU during high I/O rates. Second, IPIs are very costly and are used mainly as a latency optimization. There are benefits to dramatically reducing IPIs, if one can keep track of the rate at which interrupts are being picked up by the VMM. All this should preferably be done without the help of fine grained timers because they may be prohibitively expensive in virtualization logic.

Figure 6:
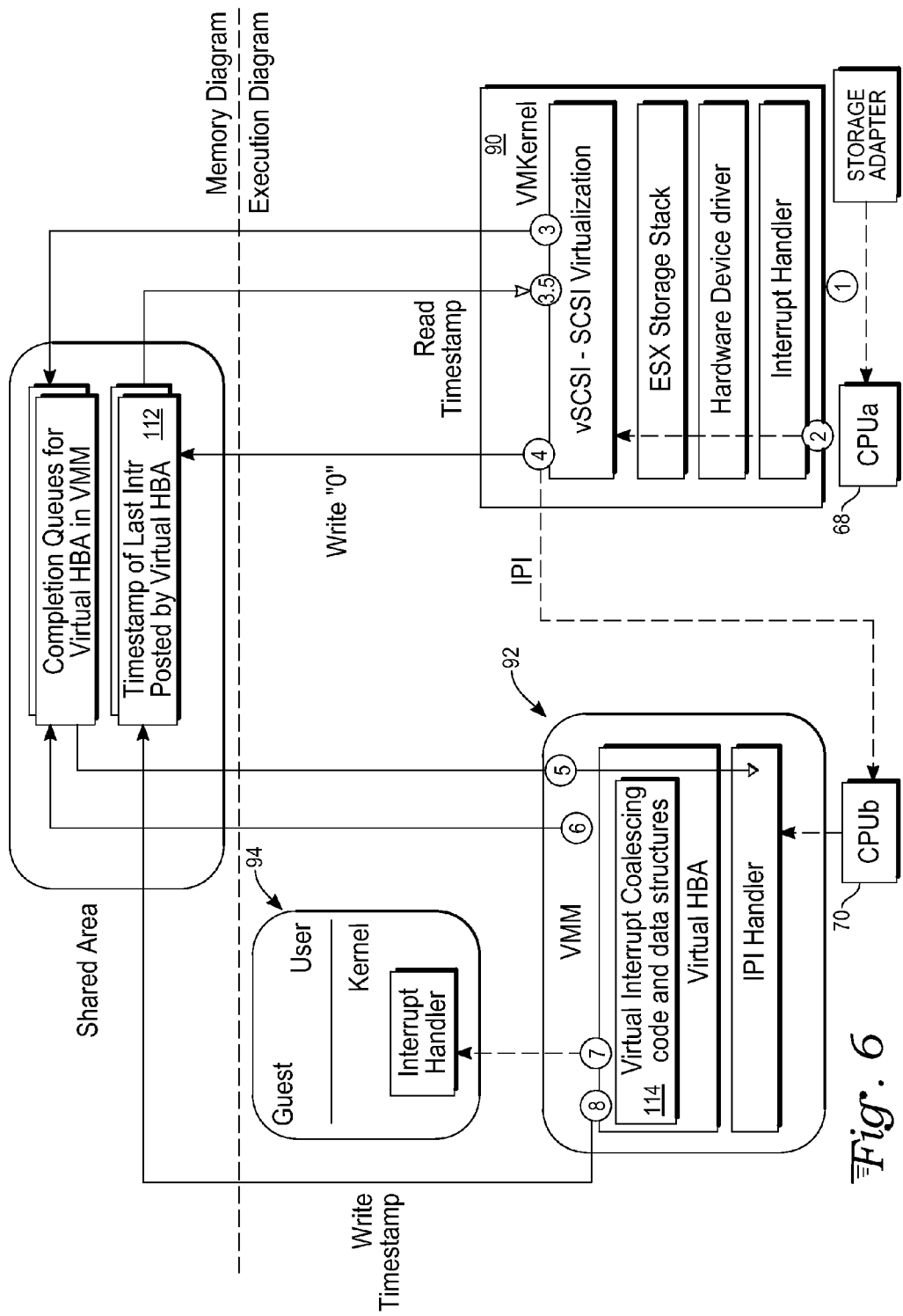
FIG. 6 is a diagram illustrating a specific computer system similar to that of FIG. 4, but with inter-processor coalescence functionality.
Figure 7:
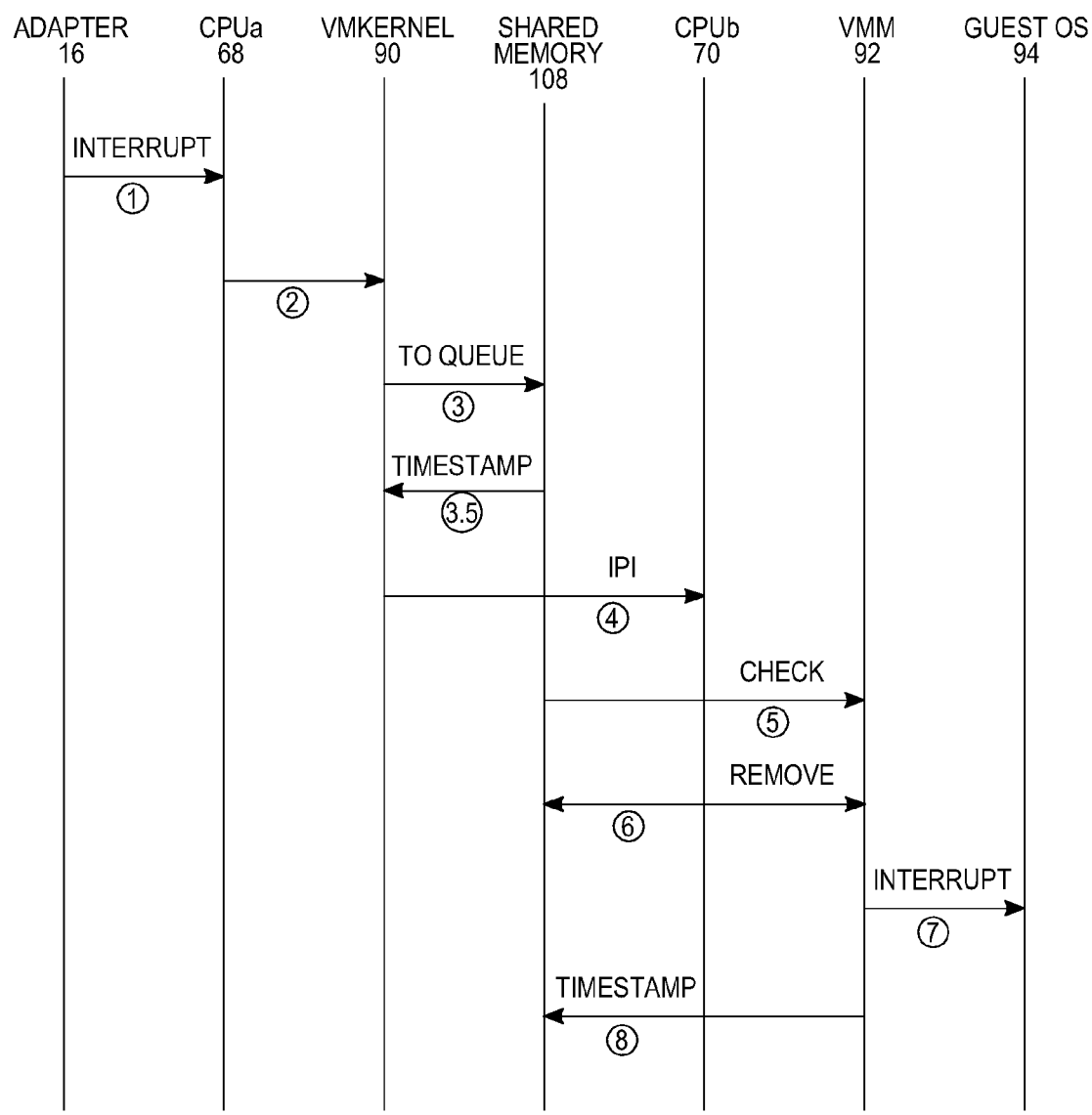
FIG. 7 is a representation of signal exchanges within the virtualized computer system of FIG. 6, enabling inter-processor interrupt coalescence.

FIGS. 6 and 7 illustrate a method that may be implemented in virtualization logic to coalesce IPIs. In addition to the functionality illustrated in FIGS. 4 and 5, this implementation adds a shared area object 112 within memory 108 and provides virtual interrupt capability 114 within the VMM 92. The added functionality is referred to as the Delivery Timestamp. The object 112 added in shared memory 108 tracks the last time that the VMM 92 fired an interrupt to the guest OS 94. As shown at step 64 in FIG. 2, a current timestamp value may be written to this shared area object after each interrupt delivery triggered at step 62. Thus, step 64 implements the Delivery TimeStamp and is represented in FIGS. 6 and 7 by the signal step (8). Before sending the IPI, the vSCSI 90 checks to ensure that the time since the last virtual interrupt is less than a configurable threshold. If the threshold is exceeded, an IPI is fired, otherwise, the IPI is deferred. Note that the IPI is a mechanism to force the VMM to wrest execution control away from the guest so as to process a completion. As such, the IPI is purely a latency optimization and correctness guarantees do not hinge on the delivery of an IPI. In the absence of IPIs, the VMM frequently acquires control by routine and will then check for completions.

FIGS. 6 and 7 include the additional data flow and computation in the system to accomplish the reduction of IPIs. The primary concern is that a guest OS 94 might have scheduled a computationally heavy task, which could result in the VMM 92 acquiring execution control only upon the next timer interrupt. The resulting delay might be several milliseconds away, on average. So, the attempt is to achieve a balance between avoiding delivers of IPIs as much as possible and bounding the extra latency increase. As part of the shared area 108 between the VMM 92 and the VMKernel 90, where completion queues 110 are managed, a new time-stamp (Delivery Timestamp 112) of the last time the VMM 92 posted an I/O completion virtual interrupt to the guest 94 (see last line of Pseudocode 2). An additional step (3.5) is executed in the VMKernel 90, whereby before firing an IPI, the current time is checked against the time the VMM posted to the object 112 in shared area. If the time difference is greater than a certain threshold, 100 microseconds by default in one embodiment, an IPI is posted. Otherwise, the VMM is allowed an opportunity to notice I/O completions in due course and in its normal routine.

Figure 8:
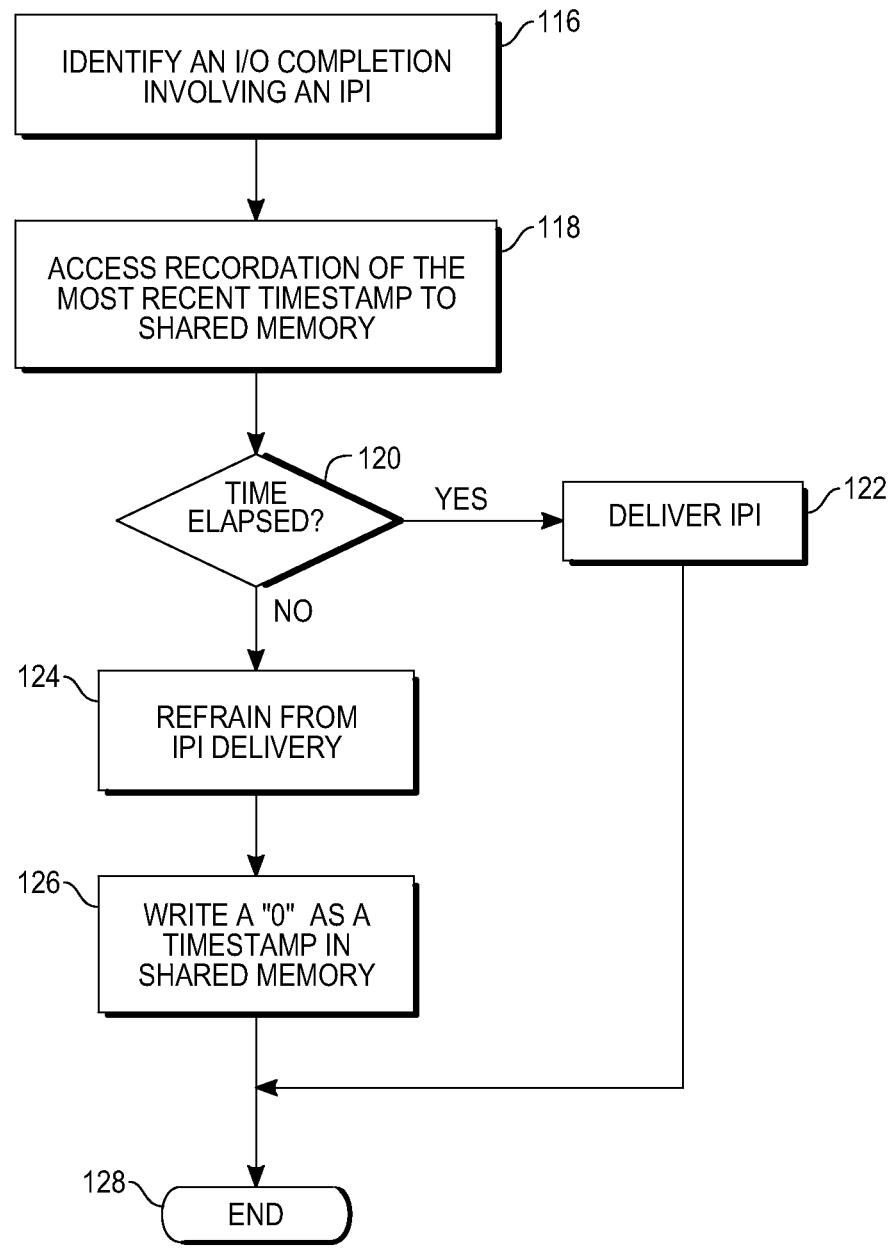
FIG. 8 is a process flow of steps for providing the inter-processor interrupt coalescence of FIGS. 6 and 7.

FIG. 8 is a succinct representation of the additional process flow. At step 116, an I/O completion involving an IPI is identified. In the embodiment of FIG. 6, the VMKernel 90 is the component which performs the identification and the "involvement" is a requirement of an IPI delivery if the target guest OS 94 is to receive an interrupt as a direct consequence of the I/O completion. However, rather than immediately delivering the IPI, the timestamp of the last interrupt delivered to the guest OS is accessed, as indicated at step 118. This may be a "read" from the object 112 in shared memory (3.5).

In decision step 120, the timestamp is used to determine whether the difference between the recorded time and the current time is greater than the threshold, such as 100 microseconds). As the response to a determination that the threshold has been exceeded, the VMKernel fires the IPI (4) to the processor 70 on which the target VM 94 is running. The delivery of the IPI occurs at step 122. On the other hand, if a negative determination is reached at decision step 120, the processing refrains from delivering an IPI, as shown by step 124. In some embodiments, a "0" is written into the shared area. As one possibility, if "0"s accumulate, before the threshold time is reached, the processing may fire an IPI prematurely. The method ends at step 128 until a next identification of a relevant I/O completion occurs.

What is claimed is:

1. In a computer system, a method of controlling interrupts which correspond to input/output (I/O) processing, the method comprising;
    for each delivery of an I/O completion interrupt, providing a recordation of a delivery time;
    identifying I/O completions for which deliveries of corresponding I/O completion interrupts involve deliveries of inter-processor interrupts; and
    for each of the identified I/O completions, accessing the recordation of a most recent delivery time to determine whether a selected period of time has elapsed since a last delivery of an inter-processor interrupt, wherein;
    (a) as a response to a determination that the selected period has elapsed, delivering an inter-processor interrupt; and
    (b) as a response to a determination that less than the duration of the selected period has elapsed, refraining from delivering an inter-processor interrupt.

2. The method of claim 1 wherein providing each recordation includes writing a timestamp for the delivery of the I/O completion interrupt and wherein determining whether the selected period has elapsed includes utilizing the timestamp as a start time of the selected period.

3. The method of claim 1 wherein identifying the I/O completions and determining whether the selected period of time has elapsed are executed in running a virtual machine (VM) on a processing unit, and wherein delivery of the inter-processor interrupt is to the processing unit and is controlled by programming running on a different processing unit in a multi-processor computer system.

4. The method of claim 1 wherein (b) refraining from delivering an inter-processor interrupt enables accessibility of the identified I/O completion in an absence of an interrupt.

5. The method of claim 1 further comprising:
 identifying I/O completions for which deliveries of corresponding interrupts do not involve inter-processor interrupts; and
 providing selective interrupt coalescing of interrupts of the corresponding I/O completions by:
 (a) dynamically basing a current level of interrupt coalescing upon a determination of outstanding I/O commands; and
 (b) executing the deliveries of the interrupts on a basis of the current level in an absence of enabling timing-triggered delivery of an interrupt.

6. The method of claim 5 wherein dynamically basing the current level of interrupt coalescing includes:
 (a) determining whether I/O operations per second (IOPS) exceeds an IOPS threshold;
 (b) as a response to determining that IOPS is below the IOPS threshold, setting the current level to disable interrupt coalescing; and
 (c) as a response to determining that IOPS is above the IOPS threshold, setting the current level to enable coalescing of interrupts.

7. The method of claim 5 wherein dynamically basing the current level of interrupt coalescing includes:
 (a) determining whether a current number of the outstanding I/O commands exceeds a CIFthreshold, the CIFthreshold being representative of a pre-selected number of I/O commands;
 (b) as a response to determining that the CIFthreshold is not exceeded, setting the current level to disable interrupt coalescing; and
 (c) as a response to determining that the CIFthreshold is exceeded, setting the current level based on a magnitude of the difference between the CIFthreshold and the current number of the outstanding I/O commands.

8. A non-transitory computer-readable storage medium containing instructions for controlling interrupts which correspond to input/output (I/O) processing, wherein the instructions when executed, control a computer system to be configured for:
 for each delivery of an I/O completion interrupt, providing a recordation of a delivery time;
 identifying I/O completions for which deliveries of corresponding I/O completion interrupts involve deliveries of inter-processor interrupts; and
 for each of the identified I/O completions, accessing the recordation of a most recent delivery time to determine whether a selected period of time has elapsed since a last delivery of an inter-processor interrupt, wherein;
 (a) as a response to a determination that the selected period has elapsed, delivering an inter-processor interrupt; and
 (b) as a response to a determination that less than the duration of the selected period has elapsed, refraining from delivering an inter-processor interrupt.

9. The non-transitory computer-readable storage medium of claim 8 wherein providing each recordation includes writing a timestamp for the delivery of the I/O completion interrupt and wherein determining whether the selected period has elapsed includes utilizing the timestamp as a start time of the selected period.

10. The non-transitory computer-readable storage medium of claim 8 wherein identifying the I/O completions and determining whether the selected period of time has elapsed are executed in running a virtual machine (VM) on a processing unit, and wherein delivery of the inter-processor interrupt is to the processing unit and is controlled by programming running on a different processing unit in a multi-processor computer system.

11. The non-transitory computer-readable storage medium of claim 8 wherein (b) refraining from delivering an inter-processor interrupt enables accessibility of the identified I/O completion in an absence of an interrupt.

12. The non-transitory computer-readable storage medium of claim 8 further configured for:
 identifying I/O completions for which deliveries of corresponding interrupts do not involve inter-processor interrupts; and
 providing selective interrupt coalescing of interrupts of the corresponding I/O completions by:
 (a) dynamically basing a current level of interrupt coalescing upon a determination of outstanding I/O commands; and
 (b) executing the deliveries of the interrupts on a basis of the current level in an absence of enabling timing-triggered delivery of an interrupt.

13. The non-transitory computer-readable storage medium of claim 12 wherein dynamically basing the current level of interrupt coalescing includes:
 (a) determining whether I/O operations per second (IOPS) exceeds an IOPS threshold;
 (b) as a response to determining that IOPS is below the IOPS threshold, setting the current level to disable interrupt coalescing; and
 (c) as a response to determining that IOPS is above the IOPS threshold, setting the current level to enable coalescing of interrupts.

14. The non-transitory computer-readable storage medium of claim 12 wherein dynamically basing the current level of interrupt coalescing includes:
 (a) determining whether a current number of the outstanding I/O commands exceeds a CIFthreshold, the CIFthreshold being representative of a pre-selected number of I/O commands;
 (b) as a response to determining that the CIFthreshold is not exceeded, setting the current level to disable interrupt coalescing; and
 (c) as a response to determining that the CIFthreshold is exceeded, setting the current level based on a magnitude of the difference between the CIFthreshold and the current number of the outstanding I/O commands.

15. An apparatus configured to for control interrupts which correspond to input/output (I/O) processing, the apparatus comprising:
 one or more computer processors; and
 a non-transitory computer-readable storage medium comprising instructions, that when executed, control the one or more computer processors to be configured for:

for each delivery of an I/O completion interrupt, providing a recordation of a delivery time;

identifying I/O completions for which deliveries of corresponding I/O completion interrupts involve deliveries of inter-processor interrupts; and for each of the identified I/O completions, accessing the recordation of a most recent delivery time to determine whether a selected period of time has elapsed since a last delivery of an inter-processor interrupt, wherein;

(a) as a response to a determination that the selected period has elapsed, delivering an inter-processor interrupt; and (b) as a response to a determination that less than the duration of the selected period has elapsed, refraining from delivering an inter-processor interrupt.

16. The apparatus of claim 15 wherein providing each recordation includes writing a timestamp for the delivery of the I/O completion interrupt and wherein determining whether the selected period has elapsed includes utilizing the timestamp as a start time of the selected period.

17. The apparatus of claim 15 wherein identifying the I/O completions and determining whether the selected period of time has elapsed are executed in running a virtual machine (VM) on a processing unit, and wherein delivery of the inter-processor interrupt is to the processing unit and is controlled by programming running on a different processing unit in a multi-processor computer system.

18. The apparatus of claim 15 wherein (b) refraining from delivering an inter-processor interrupt enables accessibility of the identified I/O completion in an absence of an interrupt.

19. The apparatus of claim 15 further configured for:

identifying I/O completions for which deliveries of corresponding interrupts do not involve inter-processor interrupts; and providing selective interrupt coalescing of interrupts of the corresponding I/O completions by:

(a) dynamically basing a current level of interrupt coalescing upon a determination of outstanding I/O commands; and (b) executing the deliveries of the interrupts on a basis of the current level in an absence of enabling timing-triggered delivery of an interrupt.

20. The apparatus of claim 19 wherein dynamically basing the current level of interrupt coalescing includes:

(a) determining whether I/O operations per second (IOPS) exceeds an IOPS threshold;

(b) as a response to determining that IOPS is below the IOPS threshold, setting the current level to disable interrupt coalescing; and (c) as a response to determining that IOPS is above the IOPS threshold, setting the current level to enable coalescing of interrupts.

21. The apparatus of claim 19 wherein dynamically basing the current level of interrupt coalescing includes:

(a) determining whether a current number of the outstanding I/O commands exceeds a CIFthreshold, the CIFthreshold being representative of a pre-selected number of I/O commands;

(b) as a response to determining that the CIFthreshold is not exceeded, setting the current level to disable interrupt coalescing; and (c) as a response to determining that the CIFthreshold is exceeded, setting the current level based on a magnitude of the difference between the CIFthreshold and the current number of the outstanding I/O commands.

* * * * *